(12) United States Patent
Keren et al.

(10) Patent No.: US 12,451,228 B2
(45) Date of Patent: Oct. 21, 2025

(54) AUGMENTED REALITY METHOD AND SYSTEM FOR DENTAL PREPARATIONS

(71) Applicant: Intellident Dentaire Inc., Westmount (CA)

(72) Inventors: Julia Keren, Westmount (CA); Nathaniel Lasry, Hampstead (CA)

(73) Assignee: Intellident Dentaire Inc., Westmount (CA)

( * ) Notice: Subject to any disclaimer, the term of this patent is extended or adjusted under 35 U.S.C. 154(b) by 246 days.

(21) Appl. No.: 18/131,656

(22) Filed: Apr. 6, 2023

(65) Prior Publication Data

US 2023/0326573 A1 Oct. 12, 2023

Related U.S. Application Data

(60) Provisional application No. 63/327,948, filed on Apr. 6, 2022.

(51) Int. Cl.
*G16H 20/40* (2018.01)
*A61B 90/00* (2016.01)
*G06T 19/00* (2011.01)
*G06T 19/20* (2011.01)

(52) U.S. Cl.
CPC .............. *G16H 20/40* (2018.01); *A61B 90/37* (2016.02); *G06T 19/006* (2013.01); *G06T 19/20* (2013.01); *A61B 2090/365* (2016.02); *G06T 2210/41* (2013.01)

(58) Field of Classification Search
None
See application file for complete search history.

(56) References Cited

U.S. PATENT DOCUMENTS

| | | | | |
|---|---|---|---|---|
| 12,178,672 | B2* | 12/2024 | Lancelle | A61B 5/4547 |
| 12,182,942 | B2* | 12/2024 | Hung | G06V 20/64 |
| 2013/0110469 | A1* | 5/2013 | Kopelman | A61C 13/0004 703/1 |
| 2018/0168781 | A1* | 6/2018 | Kopelman | G16H 30/20 |
| 2019/0125502 | A1* | 5/2019 | Haus | A61C 9/0053 |

(Continued)

FOREIGN PATENT DOCUMENTS

CA 3054100 A1 9/2018

OTHER PUBLICATIONS

PCT International Preliminary Report on Patentability in International Appln. No. PCT/CA2021/051035, dated Jan. 24, 2023, 6 pages.

(Continued)

*Primary Examiner* — Ryan M Gray
(74) *Attorney, Agent, or Firm* — Carter, DeLuca & Farrell LLP

(57) ABSTRACT

A method and system that, with a surface representation of a virtual dental preparation being provided for a specific tooth, and until an exit condition is reached, repeat: generating an overlay from the surface representation based on a computed difference between a real-dental preparation and the virtual dental preparation; and coincidently superimposing the overlay upon a feed of images of the real-dental preparation thereby generating an augmented reality feed of images. The exit condition is tied to the computed difference. The method and system allow for displaying the augmented reality feed of images.

21 Claims, 2 Drawing Sheets

(56) References Cited

U.S. PATENT DOCUMENTS

| | | | |
|---|---|---|---|
| 2019/0282344 A1 | 9/2019 | Azernikov et al. | |
| 2020/0281702 A1* | 9/2020 | Kopelman | A61C 9/006 |
| 2020/0315754 A1* | 10/2020 | Ciriello | A61B 90/14 |
| 2023/0048898 A1* | 2/2023 | Cofar | G16H 30/40 |
| 2023/0277283 A1 | 9/2023 | Piche et al. | |
| 2023/0310126 A1* | 10/2023 | Song | A61C 13/0004 |
| | | | 345/420 |

OTHER PUBLICATIONS

PCT International Search Report and Written Opinion in International Appln. No. PCT/CA2021/051035, dated Oct. 26, 2021, 10 pages (with English translation).

* cited by examiner

AUGMENTED REALITY METHOD AND SYSTEM FOR DENTAL PREPARATIONS

CROSS-REFERENCE TO RELATED APPLICATIONS

The present application claims the benefit of U.S. provisional patent application Ser. No. 63/327,948 filed on Apr. 6, 2022 by Julia Keren and Nathaniel Lasry. The contents of the above-referenced document are incorporated herein by reference in their entirety.

TECHNICAL FIELD

The present invention relates to the generation of dental reconstructions. More specifically, this invention relates to using augmented reality during dental preparations.

BACKGROUND

Dental offices are faced with hundreds of thousands of dental reconstructions per year. Each dental reconstruction typically requires a dental professional to manually design and input the characteristics of the replacement tooth to be produced. To model and produce tooth restorations (i.e. dental crowns), current clinical practice requires dentists to prepare the patient to receive a crown by removing decayed tooth portions and yielding a tooth preparation on which the crown will be installed. The quality of the tooth restoration is highly influenced by the tooth preparation. In fact, an improperly reduced tooth presents different issues such as, a thin crown that presents a higher risk of fracture gaps inside the crown that accumulate extra glue and irregularities creating failure points in the long term.

There is thus a need for a new approach to efficiently prepare a tooth and reduce the risk of improper reduction thereof and therefore increase the overall quality of the dental preparation and the dental restoration.

SUMMARY

This Summary is provided to introduce a selection of concepts in a simplified form that are further described below in the Detailed Description. This Summary is not intended to identify key aspects or essential aspects of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method that comprises, with a surface representation of a virtual dental preparation being provided for a specific tooth, and until an exit condition is reached, repeating: generating an overlay from the surface representation based on a computed difference between a real-dental preparation and the virtual dental preparation; and coincidently superimposing the overlay upon a feed of images of the real-dental preparation thereby generating an augmented reality feed of images. The method also comprises displaying the augmented reality feed of images. The exit condition is tied to the computed difference. Other embodiments of this aspect include corresponding computer systems, apparatus, and computer programs recorded on one or more computer storage devices, each configured to perform the actions of the methods.

Implementations may include one or more of the following features. The method being performed in real time during preparation of the dental preparation. The method may include, prior to computing the difference between the real-dental preparation and the virtual dental preparation, recognizing, from the feed of images, a tooth on which the dental preparation is being performed. The exit condition may be reached when the computed difference, as computed using an appropriate metric, belongs to a previously set range. The method may include, prior to coincidently superimposing the overlay, modifying the overlay by highlighting unmapped portions of the real dental preparations not yet captured. The virtual-dental preparation may be displayed to contrast with the real-dental preparation based on the computed difference. The virtual dental preparation and the real-dental preparation may be distinguished using one or more of: colors, patterns, textures, shades of grey, highlights, scintillating. The method may include generating alerts triggered by real time computation of the difference. The method may include causing the alerts to be broadcast on a display device. The method may include triggering generation of a new surface representation of a virtual dental preparation when the computed difference is smaller than a previously set value. The method may include, upon reaching the exit condition, suggesting modification of an inner contact surface of a suggested crown, the suggested modification being based on the final dental preparation, the inner contact surface defining the interface between the suggested crown and the final dental preparation and the final dental preparation being the real-dental preparation satisfying the exit condition. Implementations of the described techniques may include hardware, a method or process, or computer software on a computer-accessible medium.

One general aspect includes a system comprising a processor module operable to, with a surface representation of a virtual dental preparation being provided for a specific tooth, and until an exit condition is reached, repeat: generation of an overlay from the surface representation based on a computed difference between a real-dental preparation and the virtual dental preparation; and coincidently superimposition of the overlay upon a feed of images of the real-dental preparation thereby generating an augmented reality feed of images. The system also includes a display device operable to display the augmented reality feed of images; where the exit condition is tied to the computed difference. Other embodiments of this aspect include corresponding computer systems, apparatus, and computer programs recorded on one or more computer storage devices, each configured to perform the actions of the methods.

Implementations may include one or more of the following features. The system where the generation and the superimposition may be performed in real time during preparation of the dental preparation. The processor module may be further operable to, prior to computing the difference between the real-dental preparation and the virtual dental preparation, recognize, from the feed of images, a tooth on which the dental preparation is being performed. The exit condition may be reached when the computed difference belongs to a previously set range. The processor module may be further operable to, prior to coincidently superimposing the overlay, modify the overlay by highlighting unmapped portions of the real dental preparations not yet captured. The display device may be further operable to display, based on the computed difference, the virtual-dental preparation with contrast compared to the real-dental preparation. The virtual dental preparation and the real-dental preparation may be distinguished on the display device using one or more of: colors, patterns, textures, shades of grey, highlights, scintillating. The processor module may be further operable to generate alerts triggered by real time computation of the difference. The processor module may be further operable to cause the alerts to be broadcast on the display device The processor module may be further operable to trigger generation of a new surface representation of a virtual dental preparation when the computed difference is smaller than a previously set value. The processor module may be further operable to, upon reaching the exit condition, suggest modification of an inner contact surface of a suggested crown, the suggested modification being based on the final dental preparation, the inner contact surface defining the interface between the suggested crown and the final dental preparation and the final dental preparation being the real-dental preparation satisfying the exit condition. Implementations of the described techniques may include hardware, a method or process, or computer software on a computer-accessible medium.

All features of exemplary embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

A detailed description of specific exemplary embodiments is provided herein below with reference to the accompanying drawings in which:.

Figure 1:
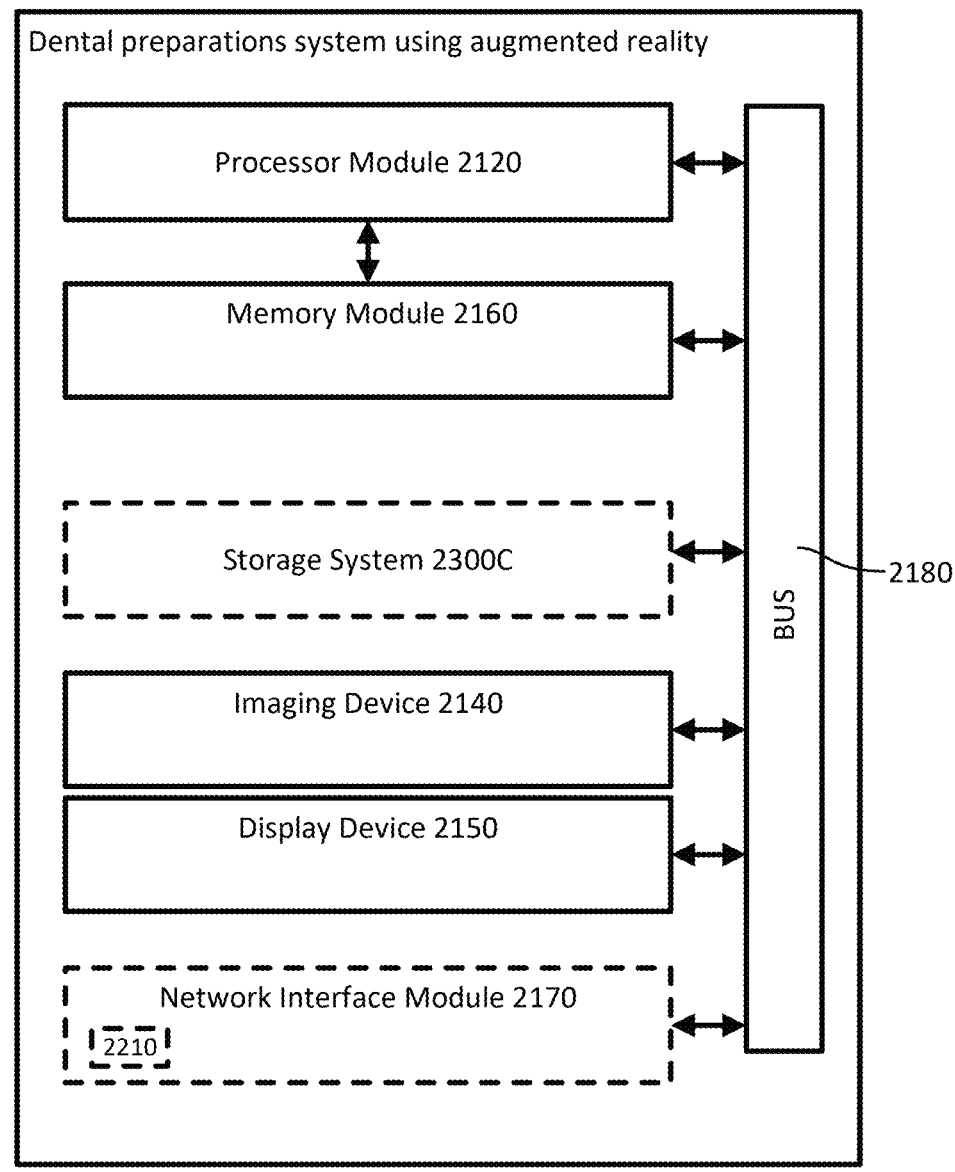
FIG. 1 is a logical modular representation of an exemplary dental preparation system using augmented reality in accordance with the teachings of the present invention.

In the drawings, exemplary embodiments are illustrated by way of example. It is to be expressly understood that the description and drawings are only for the purpose of illustrating certain embodiments and are an aid for understanding. They are not intended to be a definition of the limits of the invention.

DETAILED DESCRIPTION

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art considering the instant disclosure which variations and additions do not depart from the present technology. Hence, the following description is intended to illustrate some embodiments of the technology, and not to exhaustively specify all permutations, combinations, and variations thereof.

Dental offices are faced with hundreds of thousands of dental restorations per year. During the dental restoration process, a dental professional is typically required to manually remove decayed tooth portions in order to produce a dental preparation on which the dental restoration is to be placed. The dental preparation process is difficult to reproduce between professionals and hence leads to great variability in quality. For example, an under reduced tooth (i.e., not enough tooth material has been removed) will leave a smaller place for the crown, which results in a thin crown that presents a higher risk of fracture. Conversely, an over reduced tooth (i.e., too much tooth material has been removed) may leave less tooth material to paste the crown to and therefore reduces retention of the crown. An over reduced tooth may also cause gaps inside the crown that accumulate extra glue and irregularities creating failure points in the long term. Among other challenges that the dental professional is faced with during the dental preparation, there is the need to reduce the tooth at an angle that makes the placement of the crown on the dental preparation possible. In deed, the dental professional needs to define a path of insertion that allows insertion of the dental restauration on the dental preparation. The path of insertion would not function properly if there is an undercut in the dental preparation (i.e., an upper layer of the tooth that protrudes outwards and overshadows the margin of the tooth). In general, the undercuts lead to inappropriate insertion of the dental restauration and/or the appearance of a gap on the margin.

An alternative is provided herein to improve reproducibility, quality, and time-consumption during the process of dental preparations. This is achieved by suggesting to dental professionals a virtual-dental preparation from which a real-dental preparation can be produced. Using augmented reality techniques during the tooth preparation process, the dental professionals are provided with displayed images of the real-dental preparation as it is being prepared (or, said differently, images of the ongoing modification of the tooth) superimposed with an overlay obtained from the virtual dental preparation. The overlay is generated based on a computed difference between the real-dental preparation and the virtual-dental preparation.

Exemplary embodiments provide a method and a system for combining professional dental preparations methods with augmented reality techniques, in order to provide helpful information to dental professionals during dental preparations. Exemplary objectives may include providing a method to combine Artificial Intelligence (AI) methods with augmented reality techniques for the same purpose.

The recent developments in Artificial Intelligence algorithms allow for training(AI) models to generate dental reconstructions (e.g., crowns). The resulting (AI) models provide an improved alternative to dental reconstructions by presenting information to dental professionals that may then decide to modify a previously designed replacement tooth by an artificial intelligence (AI) model rather than designing a replacement tooth from scratch.

Additionally or alternatively, the (AI) models may further be trained to generate dental preparations taking in consideration the crowns to be installed on them. Indeed, the (AI) models may be trained to define a path of insertion of the dental restauration on the dental preparation and generate a dental preparation accordingly. The dental preparations generated by (AI) models are referred to herein as virtual-dental preparations.

Generally, the virtual-dental preparations may refer to any model or mesh (e.g., surface mesh in three dimensions 3D)

of a dental preparation that is suggested to be used as a target by the dental professional. Examples of surface representation may include: mesh networks, point clouds, implicit functions, parametric kernels etc. Augmented reality techniques may be used to show the difference between the virtual-dental preparations and the real-dental preparation by providing the dental professional with displayed images of the real-dental preparation as it is being prepared (or, said differently, images of the ongoing modification of the tooth) superimposed with an overlay obtained from the virtual dental preparation.

Figure 2:
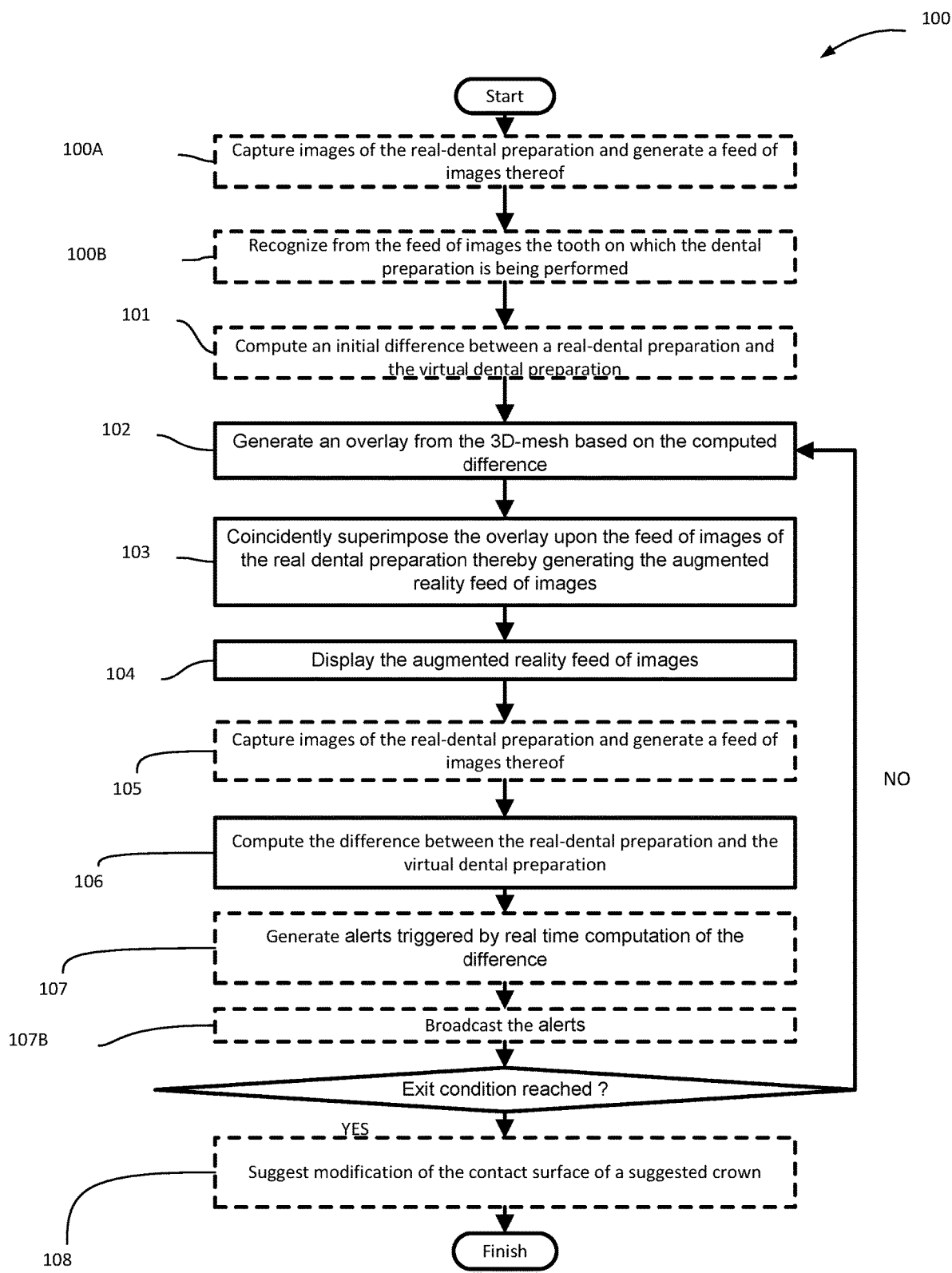
FIG. 2 is a flow chart of an exemplary method for producing a dental preparation using augmented reality in accordance with the teachings of the present invention.

In accordance with the first set of embodiments, a method 100 for combining professional dental preparations with augmented reality techniques in order to provide helpful information to dental professionals during dental preparations is shown in FIG. 2. Reference is now made to FIGS. 1 and 2 concurrently. In a first iteration, the method 100 may start by capturing 100A images of the tooth to be prepared and generating a feed of images thereof.

Capturing images of the real-dental preparation may be performed by an imaging device 2140 that may be set to take images of the tooth to be prepared during the tooth preparation. In the method 100, the imaging device 2140 may for instance be a camera, or any device that allows to image the tooth during the tooth preparation (e.g., head mounted device). The feed of images obtained in 100A of the method 100 may be from a scan performed on the mouth. Other examples of imaging devices 2140 that may be used to image the tooth during the tooth preparation may include: intraoral X-ray device, extraoral X-ray machines, panoramic and cephalometric systems, cone beam CT, image plate scanners, 3D facial scanners, digital impression scanners, intraoral cameras. The generated feed of images may be stored at a memory module 2160 or a storage system 2300C.

Once the images are captured 100A, the method 100 may compute 101 a difference between the tooth to be prepared and a virtual-dental preparation using a processor module 2120. The virtual-dental preparation may be stored at a memory module 2160 or a storage system 2300C. The virtual-dental preparation may be stored in a distant storage system and may be accessed through a network using the network interface module 2170. The computed difference may be set to reflect the mathematical distance between the virtual-dental preparation and the real-dental preparation. As a person skilled in the art may already recognize, the virtual-dental preparation and images of the real-dental preparation may be digitalized in a plurality of formats (e.g., surface mesh in 3D, implicit functions, parametric representations of surfaces, etc.). Depending on the format in which the virtual-dental preparation and images of the real-dental preparation are presented, a plurality of techniques can be used to compute, or approximate, the distance between both three-dimensional surfaces. Examples of techniques to measure distances between points, triangles, or volumetric sets may include: Hausdorff distance, Chamfer distance, Earth Mover's distances, etc.

In some embodiments, the computed difference may be set to be positive if there is still decayed portions of the tooth (real-dental preparation) that need to be removed and/or the volume and/or surface of the real-dental preparation is larger than the volume and/or surface of the virtual-dental preparation. The computed difference may be set to be negative if all decayed portions of the tooth (real-dental preparation) have been removed and/or the volume and/or surface of the real-dental preparation is smaller than the volume and/or surface of the virtual-dental preparation. The computed difference may be set to be null if all decayed portions of the tooth (real-dental preparation) have been removed and/or the volume and/or surface of the real-dental preparation is equal to the volume and/or surface of the virtual-dental preparation. In some embodiments, the computed difference may also be set to take account of the path of insertion. For example, the computed difference may be set to a high value if the path of insertion is altered. As a person skilled in the art would already recognize, the surfaces and volumes discussed herein are mathematical approximations to the real surfaces and volumes. Therefore, two surfaces or volumes are considered equal if they are within a certain tolerance (i.e., range) of each other (said differently, the computed difference will be set to be null if it is smaller than a threshold value). For example, if the difference between the volume and/or surface of the real-dental preparation and the virtual-dental preparation is lower than 275 microns than the two may considered equal. Alternatively, the tolerance may be set to take into account the relative difference between the volume and/or surface of the real-dental preparation and the virtual-dental preparation $$(\text{Surface}_{of\ the\ real\text{-}dental\ preparation} - \text{Surface}_{of\ the\ virtual\text{-}dental\ preparation}) / \text{Surface}_{of\ the\ virtual\text{-}dental\ preparation}$$

In this case, the accepted tolerance may, for example, be 5%.

In some embodiments, in order to compute the difference between the virtual-dental preparation and the real-dental preparation, the tooth on which the dental preparation is being performed is virtually divided into a plurality of sections and the difference is computed for each section. Virtually dividing the tooth on which the dental preparation is being performed into sections and computing for each section may allow the distance to be computed by section, which in turn may allow for a higher resolution thereof. For example, the tooth on which the dental preparation is being performed has been virtually divided into three distinct sections A, B, and C for which the computed difference is respectively 75, 125 and 175 microns. In this example, section A has the lowest computed difference meaning that section A of the real-dental preparation is closer to section A of the virtual-dental preparation. Section B has the second lowest computed difference meaning that section B of the real-dental preparation and the virtual-dental preparation are farther than section A of the real-dental preparation and the virtual-dental preparation. Therefore, the dental professional may decide to work more on section C as it is the section for which the real-dental preparation and the virtual-dental preparation are the most different. Dividing the tooth into sections in order to compute the difference between the real-dental preparation and the virtual-dental preparation, may also allow to divide into smaller sections the areas of the tooth that are more subtle or important during dental preparations. Such areas may include the margin line, the buccal surface of the preparation, the lingual surface of the preparation, etc.

Because capturing 100A and the initial computing 101 are optional in the method 100, alternatively, the method 100 may begin by setting the computed difference, otherwise obtained from the computing 101, to an initial value (e.g., artificially set to begin the method 100). The method 100 may comprise the optional initial capturing 100A, and/or the optional initial computing 101. Said differently, the optional initial capturing 100A and the optional initial computing 101 may be performed independently from one another.

Following optional initial computation 101 of the difference, the method 100 proceeds, using the processor module 2120, to generating 102 an overlay from the surface representation of the virtual-dental preparation based on the computed difference between the real-dental preparation and the virtual-dental preparation.

No matter how the computed difference is obtained, the method 100 generates an overlay from the surface representation of the virtual-dental preparation based on the computed difference between the real-dental preparation and the virtual dental preparation using the processor module 2120.

The method 100, using a processor module 2120, coincidently superimposes 103 the overlay upon a feed of images of the real-dental preparation thereby generating an augmented reality feed of images.

Afterwards, the method 100, by means of a display device 2150, displays 104 the augmented reality feed of images. The display device 2150 may be a display screen, head mounted device, projector, etc. The method 100 may display 104 the virtual-dental preparation to contrast with the real-dental preparation based on the computed difference using a display device 2150. For example, at the beginning of the method 100, the real-dental preparation may be displayed in a red color and as the computed difference gets smaller, the color of the real-dental preparation can be changed. The virtual-dental preparation and the real-dental preparation may be distinguished using one or more of colors, patterns, textures, shades of grey, highlights, and/or scintillating, etc. In the embodiment where the tooth to be prepared is divided into sections in order to compute the difference between the real-dental preparation and the virtual-dental preparation, each section of the virtual-dental preparation may be displayed to contrast with the corresponding section of the real-dental preparation based on the computed difference of that section. In the example where the tooth on which the dental preparation is being performed has been virtually divided into a three distinct sections A, B, and C for which the computed difference is respectively 75, 125 and 175 microns. Section A may be displayed in green, section B in orange, and section C in red. The virtual-dental preparation and the real-dental preparation may be distinguished using one or more of colors patterns, textures, shades of grey, highlights, and/or scintillating, etc.

The method 100 may capture 105 images of the real-dental preparation using an imaging device 2140 and generate 105 a new feed of images thereof. Capturing images of the real-dental preparation may be performed by an imaging device 2140 that may be set to take images of the tooth to be prepared during the tooth preparation. In the method 100, the imaging device 2140 may for instance be a camera, or any device that allows to image the tooth during the tooth preparation (e.g., head mounted device).

The feed of images obtained in step 100A of the method 100 may be from a scan performed on the mouth. Other examples of imaging devices 2140 that may be used to image the tooth during the tooth preparation may include: intraoral X-ray device, extraoral X-ray machines, panoramic and cephalometric systems, cone beam CT, image plate scanners, 3D facial scanners, digital impression scanners, intraoral cameras, etc. In some embodiments, an analog impression of the dental preparation may be digitalized, using an extra-oral scanner for instance, and used as the feed of images of step 100A. The captured images may be stored in a memory module 2160 or a storage system 2300C.

In some embodiments, imaging 105 the real-dental preparation and generating 105 a feed of images thereof may be performed periodically during the tooth preparation. The imaging period may be previously set (e.g., taking images every 30 seconds) or manually set by the dental professional. In the second case, setting the imaging period manually allows the dental professional to shorten or increase the imaging period depending on the progression of the dental preparation. For example, when the distance between the real-dental preparation and the virtual-dental preparation is within a certain range, the dental professional may decide to image the real-dental preparation more frequently and therefore shorten the imaging period. Alternatively or in addition, changing the imaging period may also be done automatically. For example, the imaging period (i.e., frequency) may be set depending on the computed difference.

In other embodiments, imaging 105 the real-dental preparation and generating a feed of images thereof may be performed in real-time processing during the tooth preparation by means of a imaging device 2140.

Next to imaging 105 the real-dental preparation and generating 105 a feed of images thereof, the method 100 computes 106 the difference between the real-dental preparation and the virtual dental preparation based on the new feed of images of the real-dental preparation using a processor module 2120. The method 100 is repeated 107B until an exit condition is reached. The exit condition is tied to the computed difference. Otherwise, the method 100, goes back to generating 102 an overlay from the surface representation based on the computed difference between the real-dental preparation and the virtual dental preparation.

In one embodiment, the exit condition is considered to be reached if the computed difference is smaller than a previously set value (e.g., 1). The exit condition may also be reached after a certain timeout of inactivity, after a number of iterations, after a certain number of iterations where the computed difference does not change, etc.

In another embodiment, the exit condition is considered to be reached if the computed difference is smaller than a previously set range of values.

Alternatively, the exit condition may be set to take into account the relative difference between the volume and/or surface of the real-dental preparation and the virtual-dental preparation:

$$(\text{Surface}_{of\ the\ real\text{-}dental\ preparation} - \text{Surface}_{of\ the\ virtual\text{-}dental\ preparation}) / \text{Surface}_{of\ the\ virtual\text{-}dental\ preparation}$$

In this case, the accepted exit condition may, for example, be 10%.

In the example where, in order to compute the difference between the virtual-dental preparation and the real-dental preparation, the tooth on which the dental preparation is being performed is virtually divided into a plurality of sections and the difference is computed for each section, an exit condition may be defined for each section. In this manner, a specific exit condition may be defined for sections of the tooth depending on, for instance, the relevance of such sections (e.g., occlusal area of the preparation) for the dental professional during dental preparations. Alternatively, the exit condition may be considered to be reached if after a certain number of iterations, the computed difference does not change for any section, etc.

In some embodiments, the dental professional may arbitrarily exit the method 100, partially or completely, during dental preparation. In the example where the tooth to be prepared is divided into sections in order to compute the difference between the real-dental preparation and the virtual-dental preparation, the dental professional may be able to skip execution of the method 100 for a specific section. Skipping one or more sections and/or exiting the method 100 arbitrarily provides an exemplary advantage of letting the dental professional decide when preparation of the tooth is completed or a certain section of the tooth is completed.

In some embodiments, the method 100 may further comprise, prior to coincidently superimposing the overlay, modifying the overlay by highlighting unmapped portions of the real-dental preparations not yet captured. Highlighting unmapped portions may prompt the dental professional to recapture the unmapped portions of the real-dental preparations. Modifying the overlay by highlighting unmapped portions of the real-dental preparations not yet captured may be performed by the processor module 2120.

In some embodiments, the method 100 may further comprise, prior to computing the difference between the real-dental preparation and the virtual dental preparation, recognizing 1008, from the feed of images, the tooth on which the dental preparation is being performed using the processor module 2120. Recognizing 100B the tooth on which the dental preparation is being performed can be manually performed by the dental professional. For example, the dental professional may input the number of the tooth that needs to be prepared into the system 2000, and the method 100 may retrieve the virtual dental preparation of this specific tooth. Casein some embodiments, the method 100 may be performed only when the recognized tooth corresponds to the specific tooth of the virtual dental preparation.

In some embodiments, the method 100 may further comprise generating 107 alerts triggered by real time computation of the difference by the processor module 2120. The generated alerts 107 may be set to indicate to the dental professional the state of the dental preparation based on the computed difference (e.g., the volume/surface of the real-dental preparation is within 10% of the volume/surface of the virtual-dental preparation). In the example where the tooth to be prepared is divided into sections in order to compute the difference between the real-dental preparation and the virtual-dental preparation, the alerts may be generated 107 for each section.

In some embodiments, the method 100 may further comprise sending the alerts to a communications device. The alerts may comprise at least one of haptic feedback, voice signals, visual signals and text. In some embodiments, causing 107B the alerts to be broadcast may be performed using vocal means, visual means, or any combinations thereof. In another embodiment, force feedback such as haptic feedback may be used to communicate the alerts. The haptic feedback may be communicated, for instance, using the dental professional's tools. The method 100 may further comprise causing 107B the alerts comprising at least one of voice signals, visual signals and text to be broadcast on a display device 2150 and/or a communication's device (not shown). Once an alert is generated, the alert may be broadcast and/or communicated periodically as long as the alert is valid. In some embodiments, the dental professional may be authorized to stop broadcasting the alert.

In some embodiments, the dental professional may arbitrarily turn off the steps of generating 107 and/or broadcasting the alerts, partially or completely, during dental preparation. In the example where the tooth to be prepared is divided into sections in order to compute the difference between the real-dental preparation and the virtual-dental preparation, the dental professional may be able to turn off the steps of generating 107 and/or broadcasting the alerts for a specific section. turning off the steps of generating 107 and/or broadcasting the alerts for one or more sections and/or turning off the steps of generating 107 and/or broadcasting the alerts for the tooth being prepared arbitrarily provides an exemplary advantage of letting the dental professional decide when alerts are needed or not.

In some embodiments, the method 100 further comprises, upon receipt of a request, allowing custom modifications of the virtual dental preparation at any given time. The request may be received before performing the dental preparation. Alternatively or additionally, the request may be received during the dental preparation. In another embodiment, the request is received after the exit condition is reached.

In some embodiments, the method 100 may further comprise triggering generation of a new surface representation of a virtual-dental preparation if the computed difference is smaller than a previously set value. For example, if the dental professional over reduced the tooth, a new surface representation of a virtual-dental preparation may be generated taking into account the computed difference. In another example, if the insertion path is altered during the dental preparation, a new virtual dental preparation having a modified path of insertion may be generated. In this way, the new surface representation of the virtual-dental preparation is generated based on the real-dental preparation. For instance, the new surface representation of the virtual-dental preparation may be generated by an (AI) model previously trained to generate surface representation of the virtual-dental preparations.

In some embodiments, the method 100 may further comprise upon reaching the exit condition, suggesting 108 modification of an inner contact surface of a suggested crown. The inner contact surface defines the interface between the suggested crown and a final dental preparation that satisfies the exit condition of the method 100. The suggested modification may be based on the final dental preparation. For instance, the new inner contact surface of a suggested crown may be generated by an (AI) model previously trained to generate an inner contact surface of a suggested crown and/or crowns.

In some embodiments, the method 100 may further comprise allowing the dental professional to zoom, rotate, make a translation of the augmented reality feed of images.

The system 2000 implementing the method 100 may be used for training purposes of new dental professionals (e.g., students). For instance, a dental trainee may be asked to perform a dental preparation on a tooth provided in academic settings, outside of a human mouth. Using the system 2000 implementing the method 100, the trainee is provided with a virtual dental preparation and is able to perform the dental preparation while having real time feedback from the system 2000. In this case, the virtual dental preparation may be generated using (AI) algorithms or may be a dental preparation used in academic settings.

The processor module 2120 may represent a single processor with one or more processor cores or an array of processors, each comprising one or more processor cores. The memory module 2160 may comprise various types of memory (different standardized or kinds of Random Access Memory (RAM) modules, memory cards, Read-Only Memory (ROM) modules, programmable ROM, etc.). The storage system 2300C may represent one or more logical or physical as well as local or remote hard disk drive (HDD) (or an array thereof). The storage system 2300C may further represent a local or remote database made accessible to a network node by a standardized or proprietary interface. The network interface module 2170 represents at least one physical interface 2210 that can be used to communicate with other network nodes. The network interface module 2170 may be made visible to the other modules of the network node through one or more logical interfaces. The actual stacks of protocols used by the physical network interface(s) and/or logical network interface(s) of the network interface module 2170 do not affect the present teachings. The variants of processor module 2120, memory module 2160, network interface module 2170 and storage system 2300C usable in the present context will be readily apparent to persons skilled in the art. Likewise, even though explicit mentions of the memory module 2160 and/or the processor module 2120 are not made throughout the present description, persons skilled in the art will readily recognize that such modules are used in conjunction with other modules of the network node to perform routine as well as innovative steps related hereto.

Various network links may be implicitly or explicitly used in the present context. While a link may be depicted as a wireless link, it could also be embodied as a wired link using a coaxial cable, an optical fiber, a category 5 cable, and the like. A wired or wireless access point (not shown) may be present on the link between. Likewise, any number of routers (not shown) may be present and part of the link, which may further pass through the Internet.

The examples provided herein are not affected by the way the different modules exchange information between them. For instance, the memory module and the processor module could be connected by a parallel bus 2180, but could also be connected by a serial connection or involve an intermediate module (not shown) without affecting the present teachings.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The present description has been presented for purposes of illustration but is not intended to be exhaustive or limited to the disclosed embodiments. Many modifications and variations will be apparent to those of ordinary skill in the art. The embodiments were chosen to explain the principles of the claimed invention and its practical applications and to enable others of ordinary skill in the art to understand the claimed invention in order to implement various embodiments with various modifications as might be suited to other contemplated uses.

Other examples of implementations will become apparent to the reader in view of the teachings of the present description and as such, will not be further described here.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced according to the present disclosure without regard for any particular theory or scheme of action.

All references cited throughout the specification are hereby incorporated by reference in their entirety for all purposes.

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated.

Although various embodiments of the disclosure have been described and illustrated, it will be apparent to those skilled in the art considering the present description that numerous modifications and variations can be made. The scope of the invention is defined more particularly in the appended claims.

The invention claimed is:

1. A method comprising:
with a surface representation of a virtual dental preparation being provided for a specific tooth, and until an exit condition is reached, repeating, in real time during preparation of a real-dental preparation:
generating an overlay from the surface representation based on a computed difference between the real-dental preparation and the virtual dental preparation;
coincidently superimposing the overlay upon a feed of images of the real-dental preparation thereby generating an augmented reality feed of images;
displaying the augmented reality feed of images; and
triggering generation of a new surface representation of a further virtual dental preparation when the computed difference is smaller than a previously set value indicating that removal of material from the real dental preparation exceeds a preset tolerance, the further virtual dental preparation replacing the virtual dental preparation and the new surface representation replacing the surface representation in a next iteration; and
upon reaching the exit condition, suggesting modification of a contact inner surface of a suggested crown, the suggested modification being based on a final version of the real-dental preparation, the contact inner surface defining an interface between the suggested crown and the final version of the real-dental preparation, the final version of the real-dental preparation being the real-dental preparation satisfying the exit condition tied to the computed difference.

2. The method of claim 1, wherein upon receipt of a request, allowing custom modifications of the virtual dental preparation.

3. The method of claim 2, wherein the request is received after the exit condition is reached.

4. The method of claim 1 wherein the exit condition is reached when the computed difference belongs to a previously set range.

5. The method of claim 1 further comprising, prior to coincidently superimposing the overlay, modifying the overlay by highlighting unmapped portions of the real-dental preparation not captured.

6. The method of claim 1 wherein the virtual dental preparation is displayed to contrast with the real-dental preparation based on the computed difference.

7. The method of claim 6 wherein the virtual dental preparation and the real-dental preparation are distinguished using one or more of colors, patterns, textures, shades of a color, highlights and scintillating.

8. The method of claim 1 further comprising generating alerts triggered by real time computation of the computed difference.

9. The method of claim 8 further comprising sending the alerts to a communications device.

10. The method of claim 8 wherein the alerts comprise at least one of haptic feedback, voice signals, visual signals and text.

11. The method of claim 10 further comprising broadcasting the alerts comprising at least one of voice signals, visual signals and text.

12. A system comprising:
a processor module operable to, with a surface representation of a virtual dental- preparation being provided for a specific tooth, and until an exit condition is reached, repeat, in real time during preparation of a real-dental preparation:
generation of an overlay from the surface representation based on a computed difference between the real-dental preparation and the virtual dental preparation; and
coincident superimposition of the overlay upon a feed of images of the real-dental preparation thereby generating an augmented reality feed of images; and
triggering generation of a new surface representation of a further virtual dental preparation when the computed difference is smaller than a previously set value indicating that removal of material from the real dental preparation exceeds a preset tolerance, the further virtual dental preparation replacing the virtual dental preparation and the new surface representation replacing the surface representation in a next iteration;
upon reaching the exit condition, suggest modification of a contact inner surface of a suggested crown, the suggested modification being based on a final version of the real-dental preparation, the contact inner surface defining an interface between the suggested crown and the final version of the real-dental preparation, the final version of the real-dental preparation being the real-dental preparation satisfying the exit condition tied to the computed difference; and
a display device operable to display the augmented reality feed of images.

13. The system of claim 12, wherein the processor module is further operable to allow custom modification of the virtual dental preparation upon receipt of a request.

14. The system of claim 12, wherein the exit condition is reached when the computed difference is within a previously set range.

15. The system of claim 12, wherein the processor module is further operable to, prior to coincidently superimposing the overlay, modify the overlay by highlighting unmapped portions of the real-dental preparation not captured.

16. The system of claim 12, wherein the display device is further operable to display, based on the computed difference, the virtual dental preparation with contrast compared to the real-dental preparation.

17. The system of claim 16, wherein the virtual dental preparation and the real-dental preparation are distinguished on the display device using one or more of: colors, patterns, textures, shades of color, highlights, scintillating.

18. The system of claim 12, wherein the processor module is further operable to generate alerts triggered by real time computation of the difference.

19. The system of claim 18, further comprising a communication device for receiving the alerts.

20. The system of claim 18, wherein the alerts comprise at least one of haptic feedback, voice signals, visual signals and text.

21. The system of claim 20, wherein the display device is further configured to broadcast the alerts comprising at least one of the voice signals, visual signals and text.

* * * * *